No. 671,231. Patented Apr. 2, 1901.
R. E. POINDEXTER.
CORN CUTTER.
(Application filed Nov. 17, 1900.)
(No Model.)
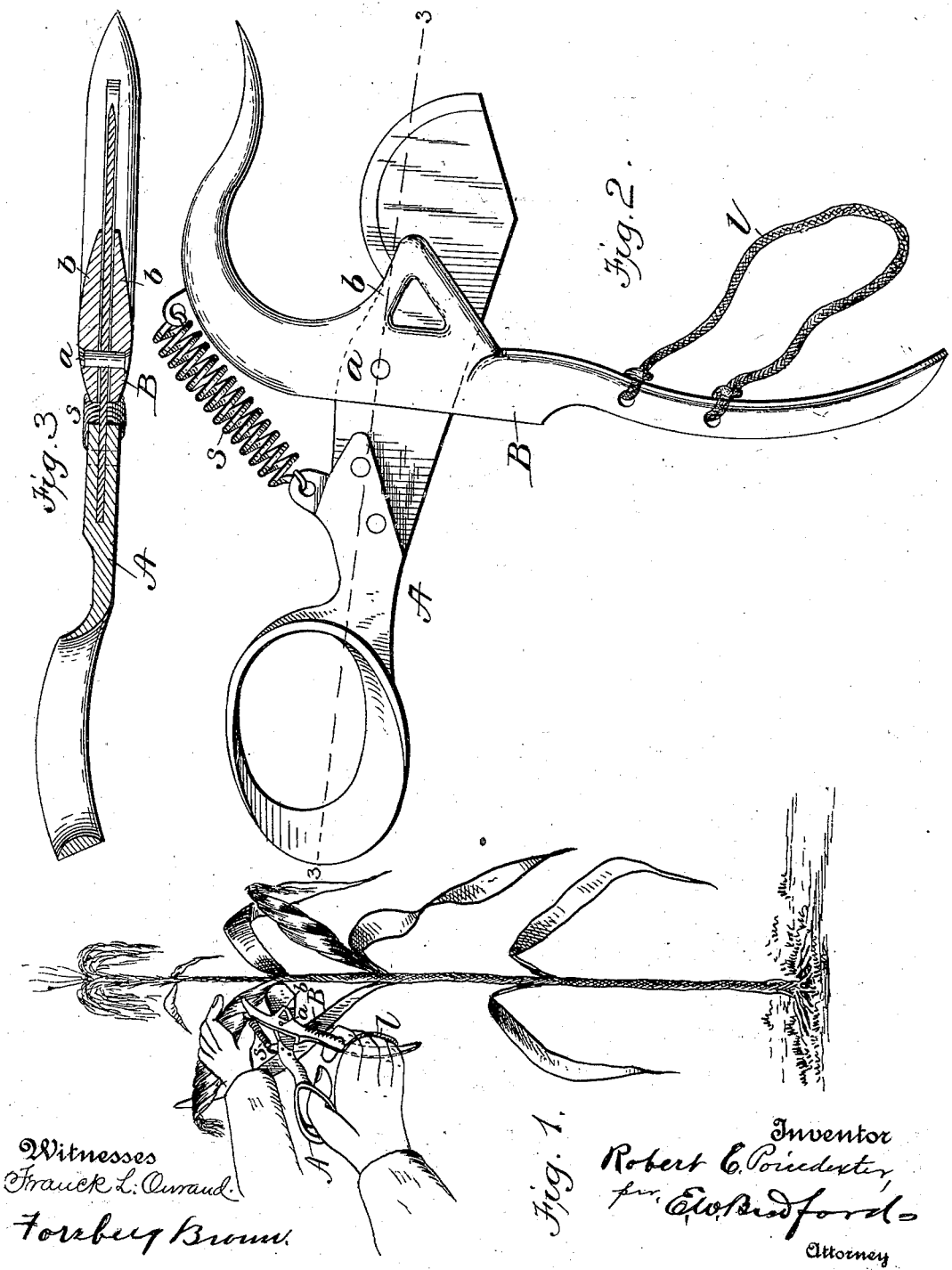

UNITED STATES PATENT OFFICE.

ROBERT E. POINDEXTER, OF INDIANAPOLIS, INDIANA.

CORN-CUTTER.

SPECIFICATION forming part of Letters Patent No. 671,231, dated April 2, 1901.

Application filed November 17, 1900. Serial No. 36,872. (No model.)

*To all whom it may concern:*

Be it known that I, ROBERT E. POINDEXTER, a citizen of the United States, residing at Indianapolis, in the county of Marion and State of Indiana, have invented certain new and useful Improvements in Corn-Cutters, of which the following is a specification.

In the use of the corn-splitting machine illustrated in my Patent No. 429,794, of June 10, 1890, and other subsequent patents I find that the best results are secured when the butt of the ear is square, or approximately so, which enables the point of the splitting-spear to more readily enter at or near the center of said ear, with the consequent apparent advantage.

The object of my said invention is, therefore, to provide an improved form of harvesting tool or cutter for cutting the ears from the stalk, whereby a square butt may be secured and the work conducted more conveniently and expeditiously, as will be hereinafter more fully described and claimed.

As is well known, the splitting of the ear of corn is to facilitate mastication by stock to which it is fed and add to its value as a food. Experience has also taught that the inner husks may be added to the feed to considerable advantage, as they contain much nutriment and are relished by stock when fed on the split corn. My improved corn harvester or cutter is designed especially so that the ear may be severed from the stock by its use just within the coarse outside husks, but to leave the finer nutritious husks on the ear, in which condition it is put into the splitting-machine and prepared for feed.

Referring to the accompanying drawings, which are made a part hereof, and on which similar letters of reference indicate similar parts, Figure 1 is a perspective view illustrating the use of my invention; Fig. 2, a side elevation of the cutter, and Fig. 3 a sectional view on the dotted line 3 3 in Fig. 2.

Said cutter is composed of two parts A and B, pivoted together by a pivot $a$. The part A consists of a handle with an appropriately-formed knife-blade secured thereto, and the part B is formed at one end as a handle and at its outer end as a jaw and is curved over in a form appropriate to partially embrace the butt of the ear. It is also formed with a slot extending a sufficient length to permit the free operation of the knife, which extends through said slot and is pivoted therein. The extreme outer end of said part is pointed and bent outward somewhat, which formation is for the purpose of enabling this part to be inserted under the outer husks, so that the cut will be made beyond where they are joined to the stalk. By this arrangement I am enabled to cut between the point where said outer husks are joined to the stalk and the point where the inner husks are joined to the stalk and secure the advantages above mentioned. On each side of the knife a brace $b$ extends outward from the front side of the part B for a considerable distance for the purpose of supporting said knife and preventing it from buckling under the strain of cutting, thus enabling a much thinner knife to be used, which can be operated with less exertion, and thus render the operation less tiresome upon the hand. A spring $s$, connected at each end to an appropriate ear on each of the parts A and B, serves to normally hold the knife open and away from the jaw formed by the opposing part of B. A loop $l$ may be attached to the handle of part B, through which the fingers of the hand may pass, for the purpose of preventing the tool from being accidentally dropped.

By the use of this tool the desired form of the butt of the ear is secured for convenient manipulation in the operation of splitting, and it has also been found that the work can be more rapidly and conveniently done than by the usual method of breaking off the ears by hand.

Having thus fully described my said invention, what I claim as new, and desire to secure by Letters Patent, is—

1. A corn cutting or harvesting tool formed to be grasped and operated by one hand to leave the other hand free to handle the corn, comprising a knife with a handle adapted to be grasped by one part of the hand, and a jaw pivoted thereto to coact therewith, provided with a handle adapted to be grasped by another part of the same hand, said knife passing through a slot in said jaw, said jaw being formed with a pointed outturned end, and its central portion curved outwardly from the knife, whereby it is adapted to be inserted under the outer husks of the ear, and then partially encircle said ear at its butt to support it against the action of said knife, substantially as set forth.

2. A corn-cutter comprising a knife and jaw formed with appropriate handles, the jaw being slotted and the knife passed through said slot and mounted on a pivot, and a brace *b* extending out from the front edge of the jaw part on each side of the knife, to support said knife under the strain of operation, substantially as set forth.

3. A corn-cutter comprising the knife A formed with an appropriate handle, the jaw part B, also formed with an appropriate handle and having a slot in which said knife is mounted on a pivot, the end of said jaw being formed with a pointed curved nose for convenient insertion under the husks, and opposite the pivot being formed with a brace *b* extending out from its front edge on each side of the knife, to support the same, and a spring for holding said parts normally open, substantially as set forth.

In witness whereof I have hereunto set my hand and seal, at Indianapolis, Indiana, this 13th day of November, A. D. 1900.

ROBERT E. POINDEXTER. [L. S.]

Witnesses:
 FRANK G. RAIBLE,
 FRED C. GARDNER.